(12) United States Patent
Chiang

(10) Patent No.: US 12,097,581 B2
(45) Date of Patent: Sep. 24, 2024

(54) ASSEMBLY JIG AND ASSEMBLY METHOD USING THE SAME

(71) Applicant: Pegatron Corporation, Taipei (TW)

(72) Inventor: Shiuan-Chai Chiang, Taipei (TW)

(73) Assignee: Pegatron Corporation, Taipei (TW)

( * ) Notice: Subject to any disclaimer, the term of this patent is extended or adjusted under 35 U.S.C. 154(b) by 170 days.

(21) Appl. No.: 18/067,899

(22) Filed: Dec. 19, 2022

(65) Prior Publication Data

US 2023/0264305 A1 Aug. 24, 2023

(30) Foreign Application Priority Data

Feb. 24, 2022 (TW) .................................. 111106805

(51) Int. Cl.
*B23P 19/02* (2006.01)
*A44C 27/00* (2006.01)

(52) U.S. Cl.
CPC .............. *B23P 19/02* (2013.01); *A44C 27/00* (2013.01)

(58) Field of Classification Search
CPC ......... B23P 19/02; B23P 19/00; B23P 21/002; A44C 27/00; A44C 5/14; B25B 11/02
See application file for complete search history.

(56) References Cited

U.S. PATENT DOCUMENTS 4,217,681 A * 8/1980 Grohoski ................. A44C 5/14
224/164
11,033,082 B1 * 6/2021 Riot ...................... A44C 5/0053

FOREIGN PATENT DOCUMENTS

CN 105234658 A * 1/2016 ............ B23P 19/027
CN 105234658 B 8/2017

* cited by examiner

*Primary Examiner* — Bayan Salone
(74) *Attorney, Agent, or Firm* — McClure, Qualey & Rodack, LLP

(57) ABSTRACT

An assembly jig is suitable for assembling a band button. The band button includes a button body, a compression spring, a torsion spring, a compression spring pin and a torsion spring pin. The assembly jig includes a base, an upper cover, a first pressing component and a pressing mechanism. The base has an accommodating groove, and the accommodating groove is configured for accommodating the button body, the compression spring, the torsion-spring positioning pin and the compression-spring positioning pin. The upper cover is combined with the base and has a slot for accommodating the torsion spring. The first pressing component is configured to press the torsion spring into the button body which is accommodated in the accommodating groove. The pressing mechanism is configured for pressing the compression spring, the compression spring pin and the torsion spring pin into the button body which is accommodated in the accommodating groove.

16 Claims, 16 Drawing Sheets

ASSEMBLY JIG AND ASSEMBLY METHOD USING THE SAME

This application claims the benefit of Taiwan application Serial No. 111106805, filed Feb. 24, 2022, the subject matter of which is incorporated herein by reference.

FIELD OF THE INVENTION

The invention relates to an assembly jig and an assembly method using the same.

BACKGROUND OF THE INVENTION

All the band button of the conventional watch straps is assembled manually. As the size of the product becomes smaller and smaller (some springs have an outer diameter of less than 1 mm and a length of only 2 to 4 mm), some problems such as increased assembly difficulty, lower yield, higher labor costs and lower production capacity are occurred. In view of this, how to propose a new band button assembly technology to resolve the abovementioned conventional problems is one of the directions of the efforts of those skilled in the art.

SUMMARY OF THE INVENTION

In an embodiment of the invention, an assembly jig is provided. The assembly jig is suitable for assembling a band button of a watch strap, wherein the band button comprises a button body, a compression spring, a torsion spring, a compression-spring positioning pin and a torsion-spring positioning pin, and the assembly jig includes a base, an upper cover, a first pressing component and a pressing mechanism. The base has an accommodating groove configured for accommodating the button body, the compression spring, the compression-spring positioning pin and the torsion-spring positioning pin; an upper cover combined with the base and having a slot for accommodating the torsion spring. The first pressing component is configured for pressing the torsion spring into the button body which is accommodated in the accommodating groove. The pressing mechanism is configured for pressing the compression spring, the compression-spring positioning pin and the torsion-spring positioning pin into the button body which is accommodated in the accommodating groove.

In another embodiment of the invention, an assembly method is provided. The assembly method for assembling a band button by using an assembly jig, wherein the assembly jig comprises a base, an upper cover, a first pressing component and a pressing mechanism. The assembly method includes the following steps: disposing a button body, a compression spring, a compression-spring positioning pin and a torsion-spring positioning pin in an accommodating groove of the base; combining the base with the upper cover; disposing a torsion spring in a slot of the upper cover; pressing, by the first pressing component, the torsion spring into the button body which is accommodated in the accommodating groove; and pressing, by the pressing mechanism, the compression spring, the compression-spring positioning pin and the torsion-spring positioning pin into the button body which is accommodated in the accommodating groove.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 1:
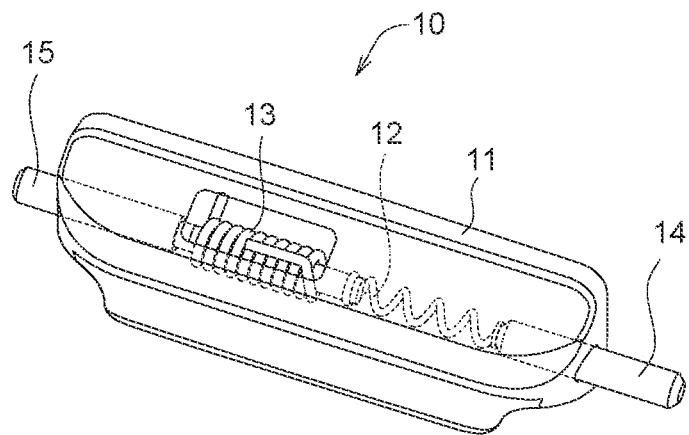
FIG. 1 shows a schematic diagram of a band button according to an embodiment of the present invention.
Figure 2A:
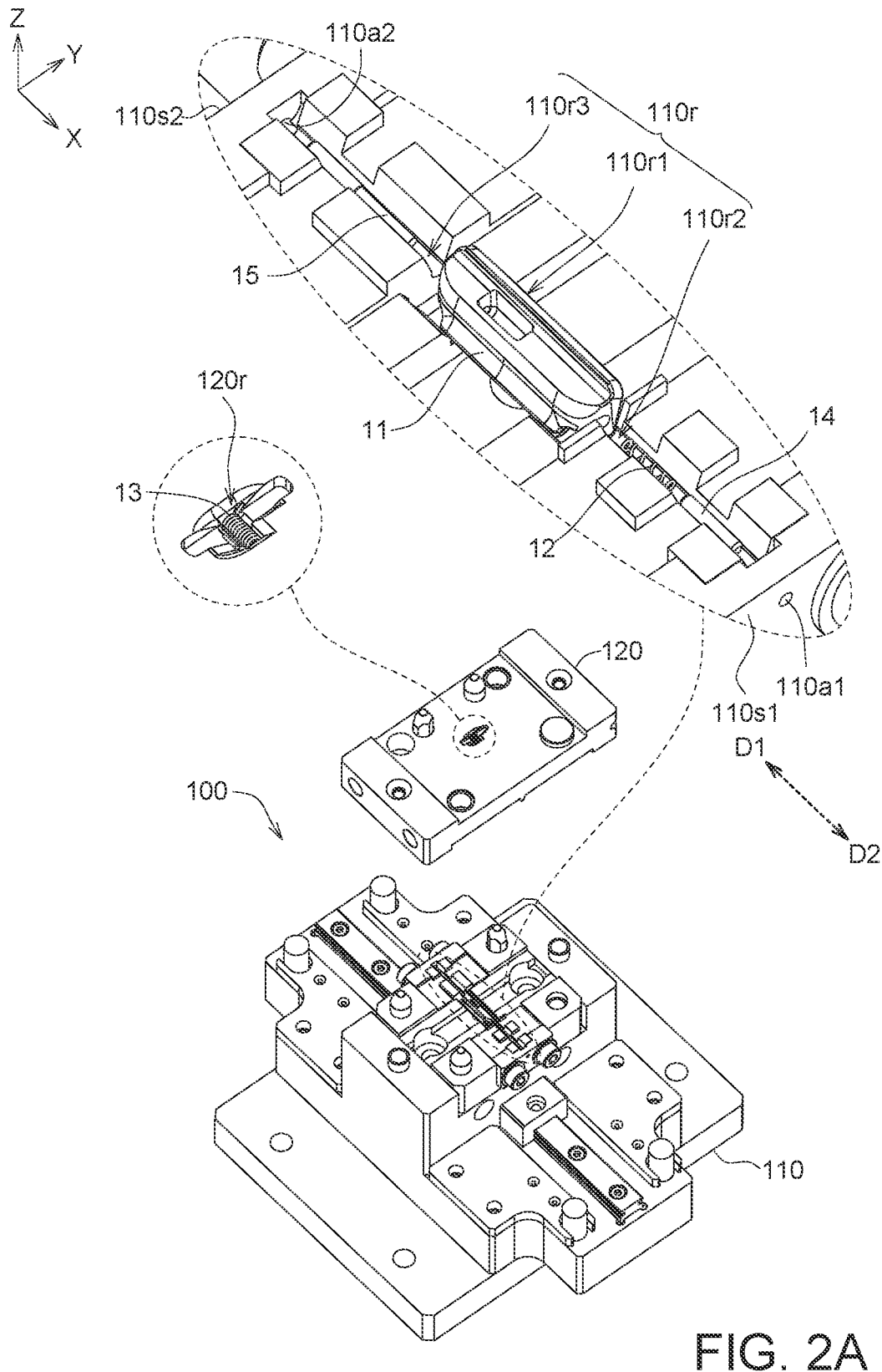
FIG. 2A shows a schematic diagram of the base and the upper cover of the assembly jig before being assembled according to an embodiment of the present invention.
Figure 2B:
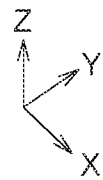
FIG. 2B shows a schematic diagram of the base and the upper cover of FIG. 2A after being assembled.
Figure 2B:
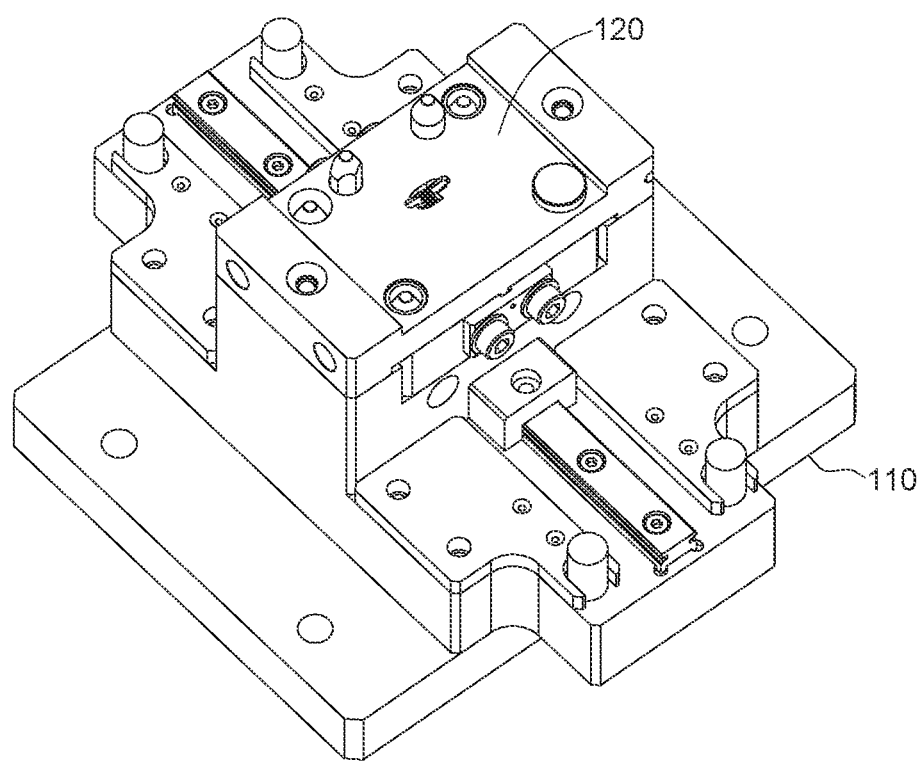
Figure 2C:
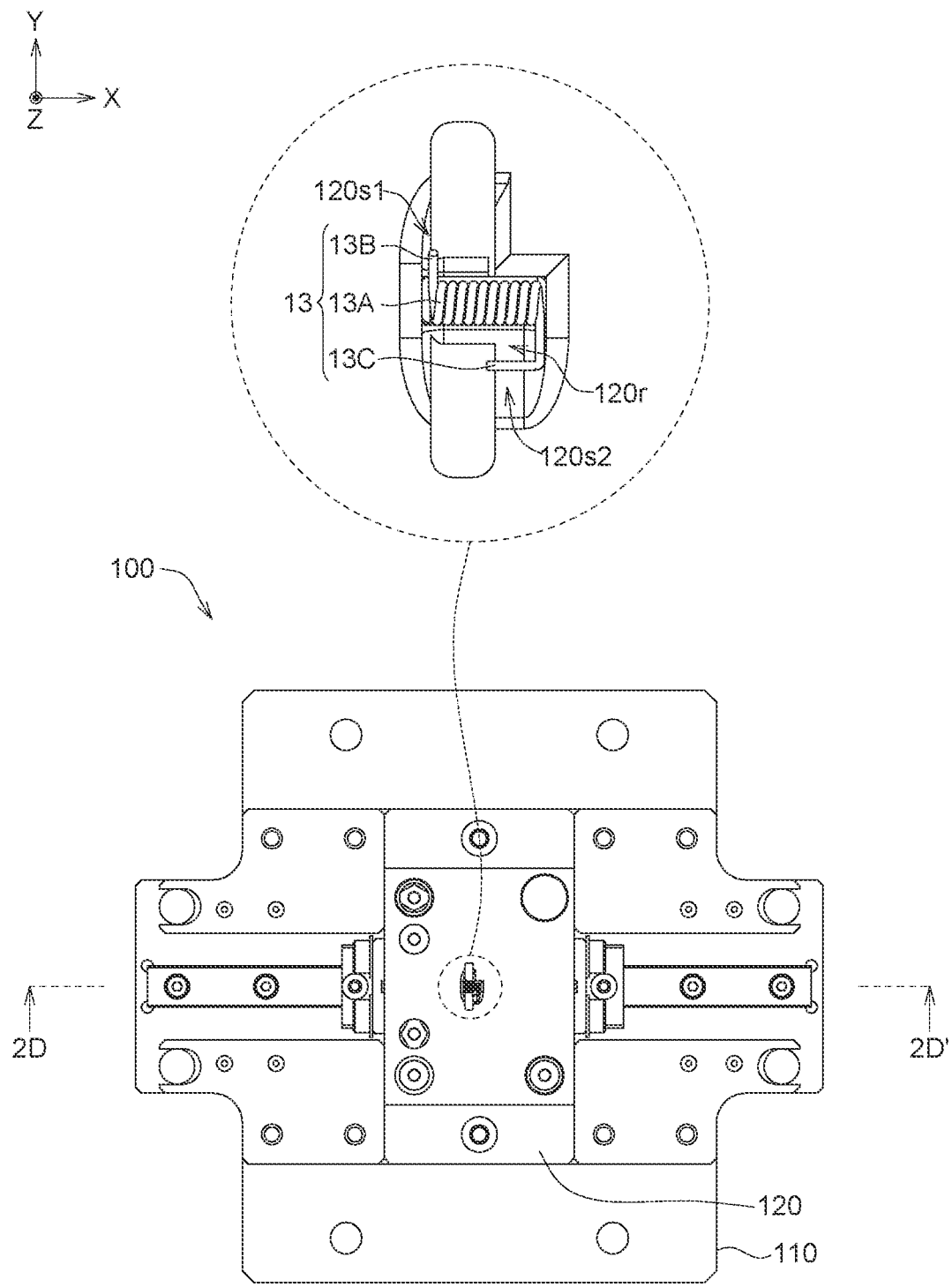
FIG. 2C shows a schematic diagram of a top view of the assembly jig of FIG. 2B.
Figure 2D:
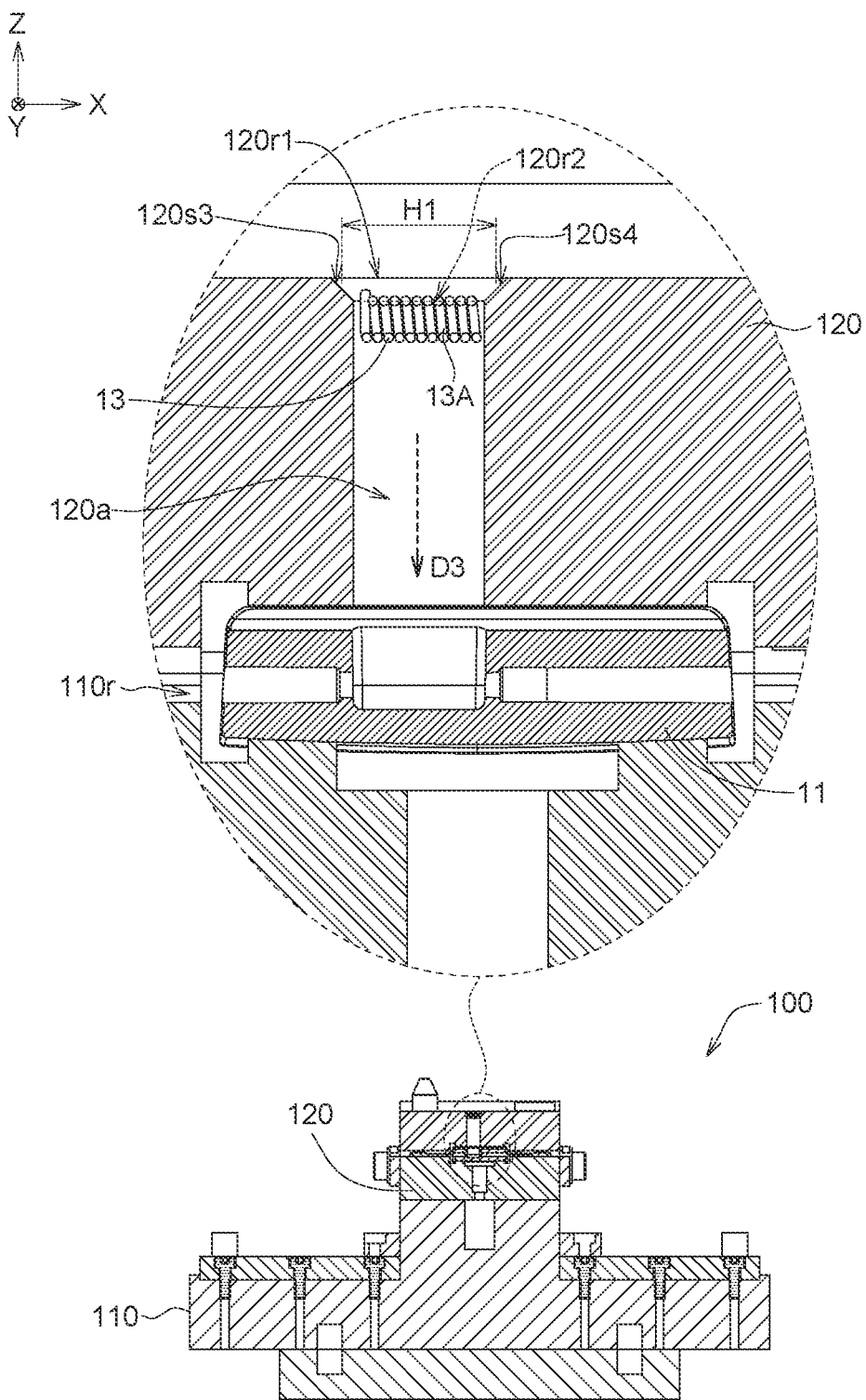
FIG. 2D shows a schematic diagram of a cross-sectional view of the assembly jig of FIG. 2C along a direction 2D-2D'.
Figure 3A:
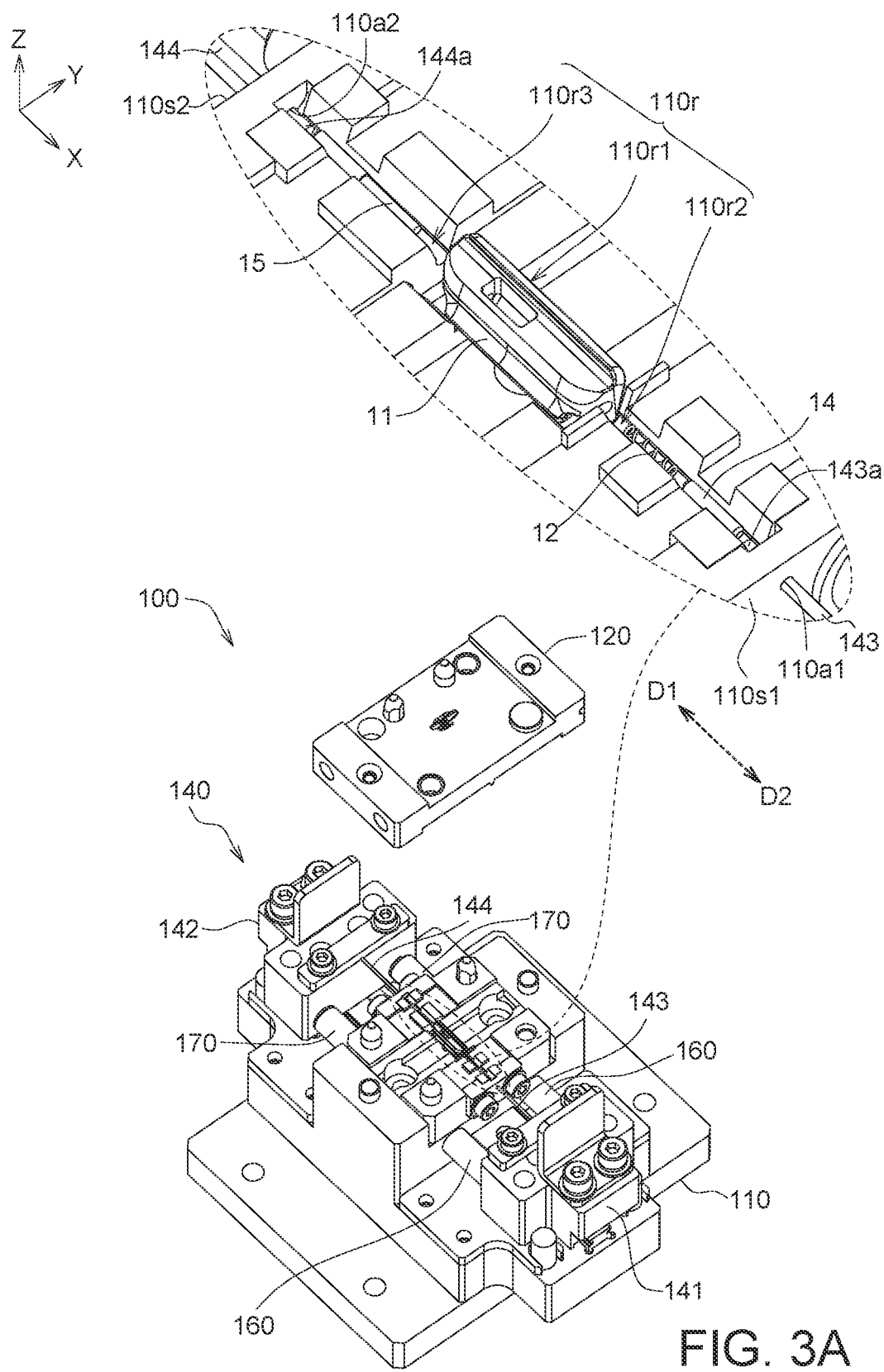
FIG. 3A shows a schematic diagram of the assembly jig of FIG. 2A further including a pressing mechanism (before the upper cover and the base are assembled)
Figure 3B:
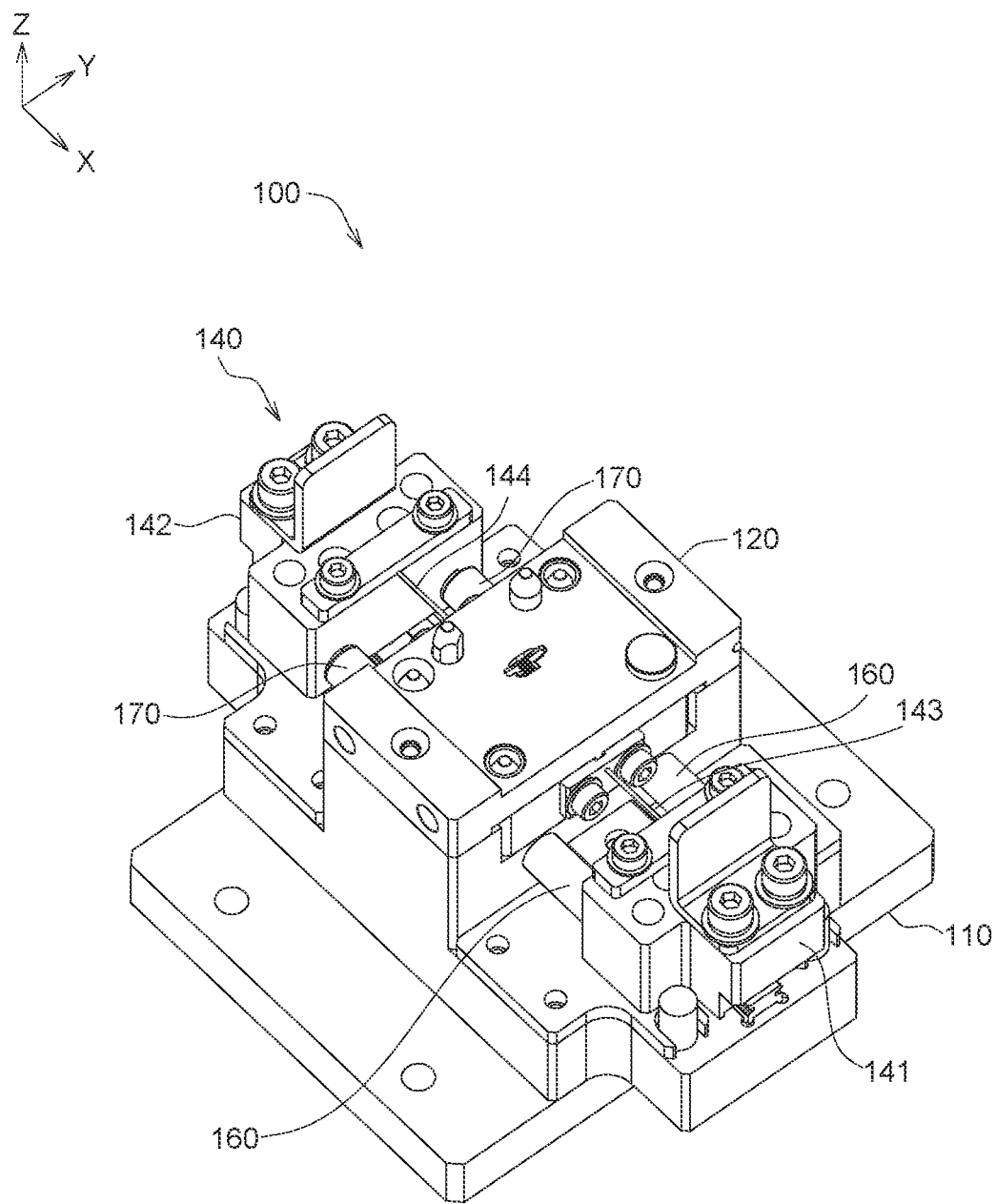
FIG. 3B shows a schematic diagram of the upper cover and the base of FIG. 3A after being assembled.
Figure 4A:
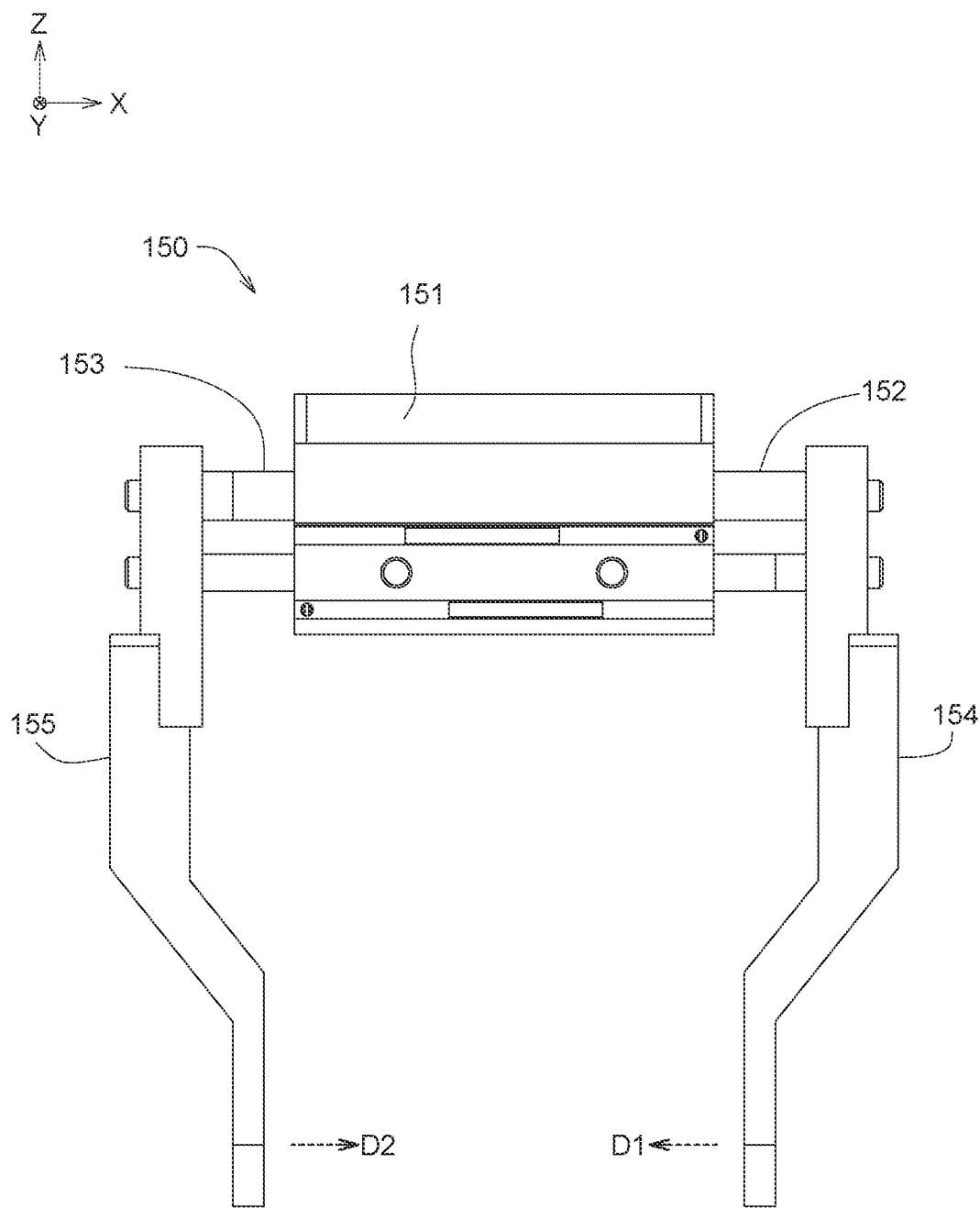
FIG. 4A shows a schematic diagram of a front view of a first driving mechanism according to an embodiment of the present invention.
Figure 4B:
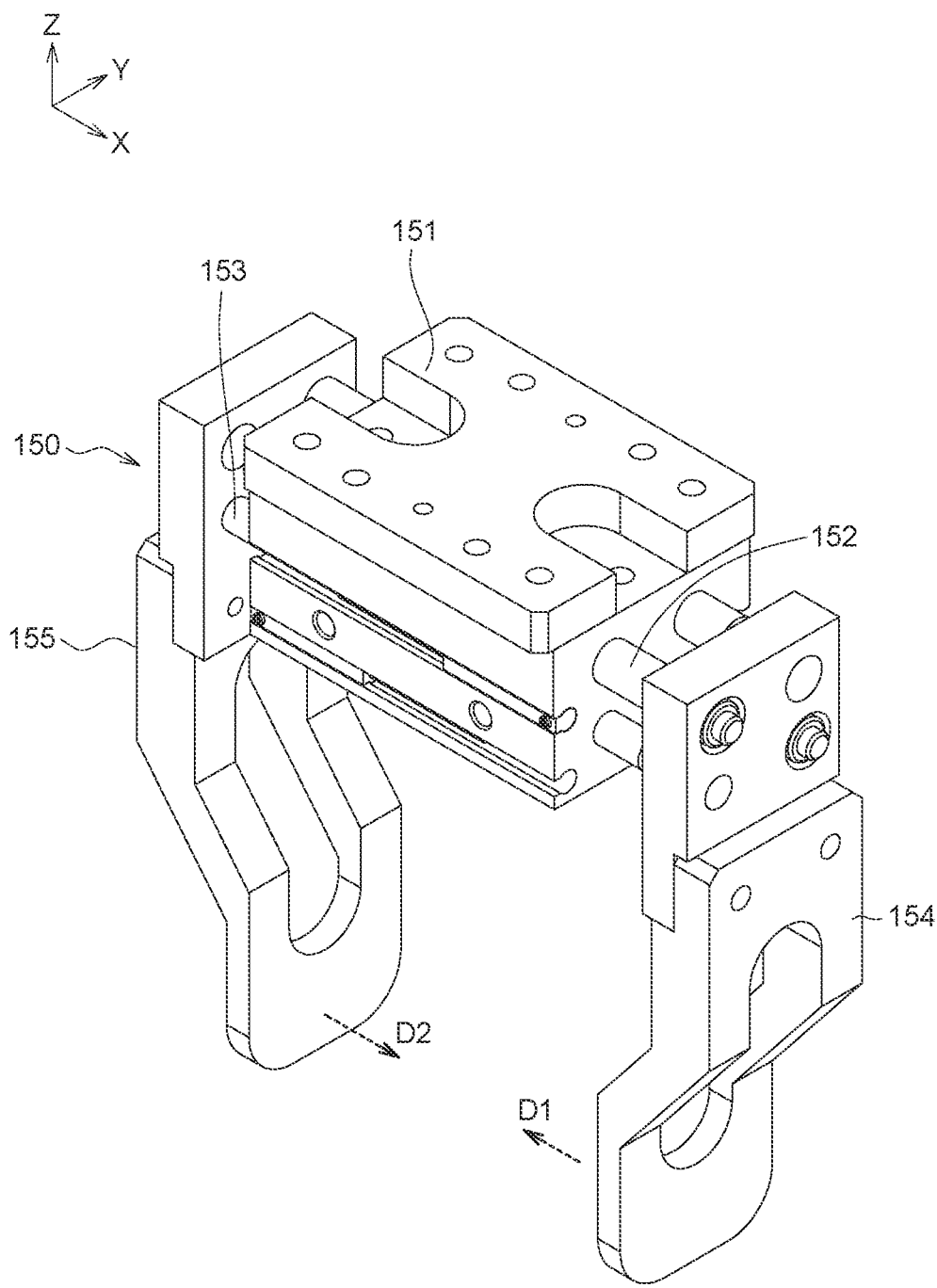
FIG. 4B shows a stereoscopic schematic diagram of the first driving mechanism of FIG. 4A.
Figure 5:
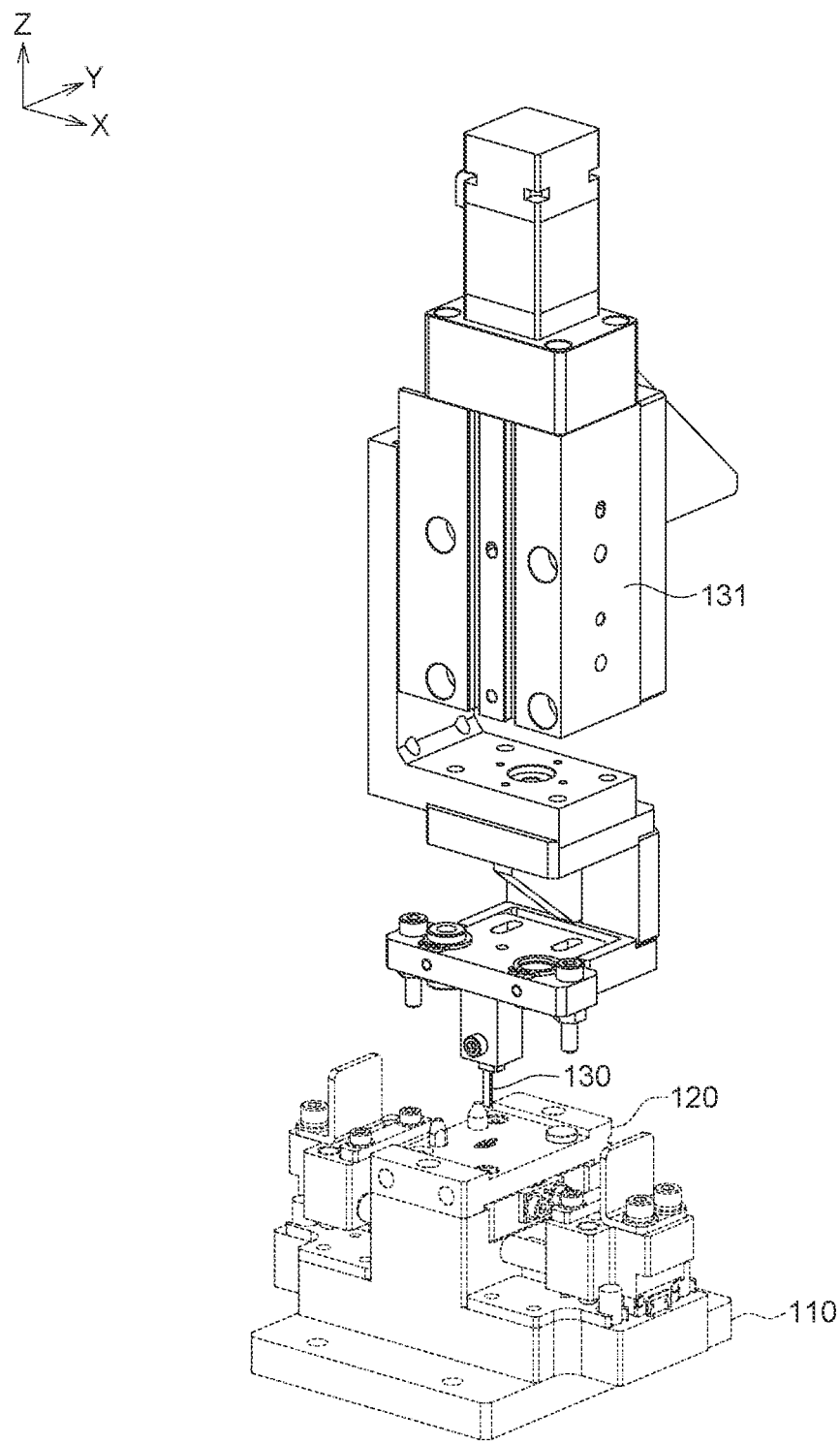
FIG. 5 shows a schematic diagram of a first pressing component according to an embodiment of the present invention.

Referring to FIGS. 1 to 5, FIG. 1 shows a schematic diagram of a band button 10 according to an embodiment of the present invention, FIG. 2A shows a schematic diagram of the base 110 and the upper cover 120 of the assembly jig 100 before being assembled according to an embodiment of the present invention, FIG. 2B shows a schematic diagram of the base 110 and the upper cover 120 of FIG. 2A after being assembled, FIG. 2C shows a schematic diagram of a top view of the assembly jig 100 of FIG. 2B, FIG. 2D shows a schematic diagram of a cross-sectional view of the assembly jig 100 of FIG. 2C along a direction 2D-2D', FIG. 3A shows a schematic diagram of the assembly jig 100 of FIG. 2A further including a pressing mechanism 140 (before the upper cover 120 and the base 110 are assembled), FIG. 3B shows a schematic diagram of the upper cover 120 and the base 110 of FIG. 3A after being assembled, FIG. 4A shows a schematic diagram of a front view of a first driving mechanism 150 according to an embodiment of the present invention, and FIG. 4B shows a stereoscopic schematic diagram of the first driving mechanism 150 of FIG. 4A, and FIG. 5 shows a schematic diagram of a first pressing component 130 according to an embodiment of the present invention.

As shown in FIG. 1, the band button 10 may be connected to a watch strap, and then connected to a watch body (not shown) through a spring. The band button 10 includes a button body 11, a compression spring 12, a torsion spring 13, a compression-spring positioning pin 14 and a torsion-spring positioning pin 15, wherein the compression spring 12, the torsion spring 13, the compression-spring positioning pin 14 and the torsion-spring positioning pin 15 are disposed within the button body 11.

As shown in FIGS. 2A, 2B, 3A and 5, the assembly jig 100 is suitable for assembling a band button 10. The assembly jig 100 includes a base 110, an upper cover 120, a first pressing component 130 and a pressing mechanism 140. The base 110 has an accommodating groove 110r for accommodating the button body 11, the compression spring 12, the compression-spring positioning pin 14 and the torsion-spring positioning pin 15. The upper cover 120 may be combined with the base 110 and has a slot 120r for accommodating the torsion spring 13. The first pressing component 130 is configured for pressing the torsion spring 13 into the button body 11 accommodated in the accommodating groove 110r. The pressing mechanism 140 is configured for pressing the compression spring 12, the compression-spring positioning pin 14 and the torsion-spring positioning pin 15 into the button body 11 accommodated in the accommodating groove 110r. As a result, the band button 10 may be assembled through the assembly jig 100, and accordingly various technical effects such as reducing assembly difficulty, increasing yield, reducing labor cost and/or increasing productivity may be achieved.

As shown in FIG. 2A, the accommodating groove 110r includes a first sub-accommodating groove 110r1, a second sub-accommodating groove 110r2, and a third sub-accommodating groove 110r3 that communicate with each other. The first sub-accommodating groove 110r1 is configured for accommodating the button body 11, the second sub-accommodating groove 110r2 is configured for accommodating the compression spring 12 and the compression-spring positioning pin 14, and the third sub-accommodating groove 110r3 is configured for accommodating the torsion-spring positioning pin 15. In the present embodiment, the second sub-accommodating groove 110r2, the first sub-accommodating groove 110r1 and the third sub-accommodating groove 110r3 may be arranged along a moving direction, for example, the first direction D1 or the second direction D2 along the X-axis. The first sub-accommodating groove 110r1 is located between the second sub-accommodating groove 110r2 and the third sub-accommodating groove 110r3. It is worth noting that the first sub-accommodating groove 110r1, the second sub-accommodating groove 110r2 and the third sub-accommodating groove 110r3 are arranged in a straight line, so that the compression spring 12, the compression-spring positioning pin 14 and the torsion-spring positioning pin 15 may be pressed into the button body 11.

As shown in FIG. 2D, the upper cover 120 has a channel 120a, and the channel 120a extends linearly in an extending direction and communicates with the accommodating groove 110r. For example, the channel 120a extends in the third direction D3 of the Z-axis, the extending direction and the moving direction are substantially perpendicular to each other (the first or second directions D1, D2 are perpendicular to the third direction D3). The torsion spring 13 may enter the button body 11 through the channel 120a.

As shown in FIGS. 2C and 2D, the slot 120r has a first wall 120s1, a second walls 120s1 opposite to the first wall 120s1, a third wall 120s3, a fourth walls 120s4 opposite to the third wall 120s3, an upper opening 120r1 and a lower opening 120r2 opposite to opposite to the upper opening 120r1. The torsion spring 13 may be disposed within the slot 120r through the upper opening 120r1. The torsion spring 13 includes a spiral portion 13A, a first end 13B and a second end 13C. The spiral portion 13A is disposed between the first end 13B and the second end 13C. When the torsion spring 13 is in a free state, the first end 13B and the second end 13C may abut against the first wall 120s1 and the second wall 120s2 respectively, and accordingly it may prevent the torsion spring 13 from being separated from the upper cover 120 through the lower opening 120r2.

As shown in FIGS. 2C and 2D, the lower opening 120r2 is smaller than the upper opening 120r1. Furthermore, the third wall 120s3 and the fourth wall 120s4 are, for example, inclined surfaces. A distance H1 between the third wall 120s3 and the fourth wall 120s4 gradually shrinks along a direction from the upper opening 120r1 to the lower opening 120r2, so that an area of the lower opening 120r2 is smaller than that of the upper opening 120r1. A projected area of the spiral portion 13A projected on the lower opening 120r2 is equal to or smaller than an area of the lower opening 120r2 (it may be seen that the spiral portion 13A of FIG. 2D protrudes with respect to the lower opening 120r2). Due the projected area of the spiral portion 13A projected on the lower opening 120r2 being equal to or smaller than the area of the lower opening 120r2, the deformed torsion spring 13 (the first end 13B and the second end 13C of the torsion spring 13 are deformed and retracted after being applied by force) may enter the accommodating groove 110r by entirely passing through the lower opening 120r2.

As shown in FIG. 3A, the pressing mechanism 140 is connected to the base 110. The pressing mechanism 140 includes a first sliding seat 141, a second sliding seat 142, a second pressing component 143 and a third pressing component 144. The first sliding seat 141 and the second sliding seat 142 are disposed on the base 110. For example, the first sliding seat 141 and the second sliding seat 142 are movably disposed on the base 110, wherein the first sliding seat 141 and the second sliding seat 142 are located at opposite two sides of the accommodating groove 110r respectively.

As shown in FIGS. 3A and 3B, the second pressing component 143 is connected to (for example, fixed to) the first sliding seat 141, and an end portion 143a of the second pressing component 143 faces the compression-spring positioning pin 14 for pressing the compression spring 12 and the compression-spring positioning pin 14 into the button body 11. In the present embodiment, the base 110 has a first lateral surface 110s1 and a first through hole 110a1, wherein the first through hole 110a1 extends to the accommodating groove 110r from the first lateral surface 110s1. The second pressing component 143 is disposed through the first through hole 110a1 so that the end portion 143a of the second pressing component 143 may be disposed in the second sub-accommodating groove 110r2 of the accommodating groove 110r.

Similarly, as shown in FIGS. 3A and 3B, the third pressing component 144 is connected to (for example, fixed to) the second sliding seat 142, and an end 144a of the third pressing component 144 faces the torsion-spring positioning pin 15 for pressing the torsion-spring positioning pin 15 into the button body 11. In the present embodiment, the base 110 has a second through hole 110a2 and a second lateral surface 110s2 opposite to the first lateral surface 110s1. The second through hole 110a2 extends to the accommodating groove 110r from the second lateral surface 110s2. The third pressing component 144 is disposed through the second through hole 110a2 so that the end portion 144a of the third pressing component 144 may be disposed in the third sub-accommodating groove 110r3 of the accommodating groove 110r.

As shown in FIGS. 3A and 3B, the pressing mechanism 140 is movably connected to the base 110. For example, the assembly jig 100 further includes a first elastic component 160 and a second elastic component 170. The pressing mechanism 140 and the base 110 are connected through the first elastic component 160 and the second elastic component 170, and accordingly the pressing mechanism 140 and the base 110 may move relatively. Furthermore, the first elastic component 160 connects the base 110 and the first sliding seat 141. When the first sliding seat 141 moves along the first direction D1, the first elastic component 160 is deformed to store elastic potential energy. When the first elastic component 160 releases the elastic potential energy, it may provide the first sliding seat 141 with an elastic restoring force to restore the first sliding seat 141 along the second direction D2, thereby driving the second pressing component 143 to restore. Namely, the first sliding seat 141 return to an initial position. Similarly, the second elastic component 170 connects the base 110 and the second sliding seat 142. The second direction D2 and the first direction D1 are opposite two directions. When the second sliding seat 142 moves along the second direction D2, the second elastic component 170 is deformed to store an elastic potential energy. When the second elastic component 170 releases the elastic potential energy, it may provide the second sliding seat 142 with an elastic restoring force to restore the second sliding seat 142 along the first direction D1, thereby driving the third pressing component 144 to restore. Namely, the second sliding seat 142 return to an initial position. In addition, the first elastic component 160 and/or the second elastic component 170 are, for example, the springs, such as the compression springs, but may also be other types.

As shown in FIGS. 3A, 4A and 4B, the assembly jig 100 further includes a first driving mechanism 150 configure to drive the pressing mechanism 140. The first driving mechanism 150 includes a cylinder 151, a first piston rod 152, a second piston rod 153, a first connecting rod 154 and a second connecting rod 155, wherein the cylinder 151 is, for example, an air pressure cylinder or an oil pressure cylinder, the first piston rod 152 is slidably disposed through a side of the cylinder 151, and the second piston rod 153 is slidably disposed through another opposite side of the cylinder 151. By the driving of the cylinder 151, the first piston rod 152 and the second piston rod 153 may be extended or shortened relative to the cylinder 151. The first piston rod 152 is connected to the first connecting rod 154, and the first piston rod 152 may drive the first connecting rod 154 to move. When the first piston rod 152 moves along the first direction D1, the first connecting rod 154 moves along the first direction D1 to drive the first sliding seat 141 and the second pressing component 143 to move along the first direction D1 until the second pressing component 143 presses the compression spring 12 and the compression-spring positioning pin 14 into the button body 11. When the first piston rod 152 moves along the second direction D2, the first connecting rod 154 releases the first sliding seat 141. At the same time, the first elastic component 160 releases the elastic potential energy to drive the first sliding seat 141 and the second pressing component 143 to restore along the second direction D2.

Similarly, as shown in FIGS. 3A, 4A and 4B, the second piston rod 153 is connected to the second connecting rod 155, and the second piston rod 153 may drive the second connecting rod 155 to move. When the second piston rod 153 moves along the second direction D2, the second connecting rod 155 moves along the second direction D2 to drive the second sliding seat 142 and the third pressing component 144 to move along the second direction D2 until the third pressing component 144 presses the torsion-spring positioning pin 15 into the button body 11. When the second piston rod 153 moves along the first direction D1, the second connecting rod 155 releases the second sliding seat 142. At the same time, the second elastic component 170 releases the elastic potential energy to drive the second sliding seat 142 and the third pressing component 144 to restore along the first direction D1.

The assembly process of the band button 10 of FIG. 1 is described below.

Referring to FIGS. 6A to 6F, FIGS. 6A to 6F show schematic diagrams of assembling the band button 10 of FIG. 1 using the assembly jig 100 of FIG. 3B.

Figure 6A:
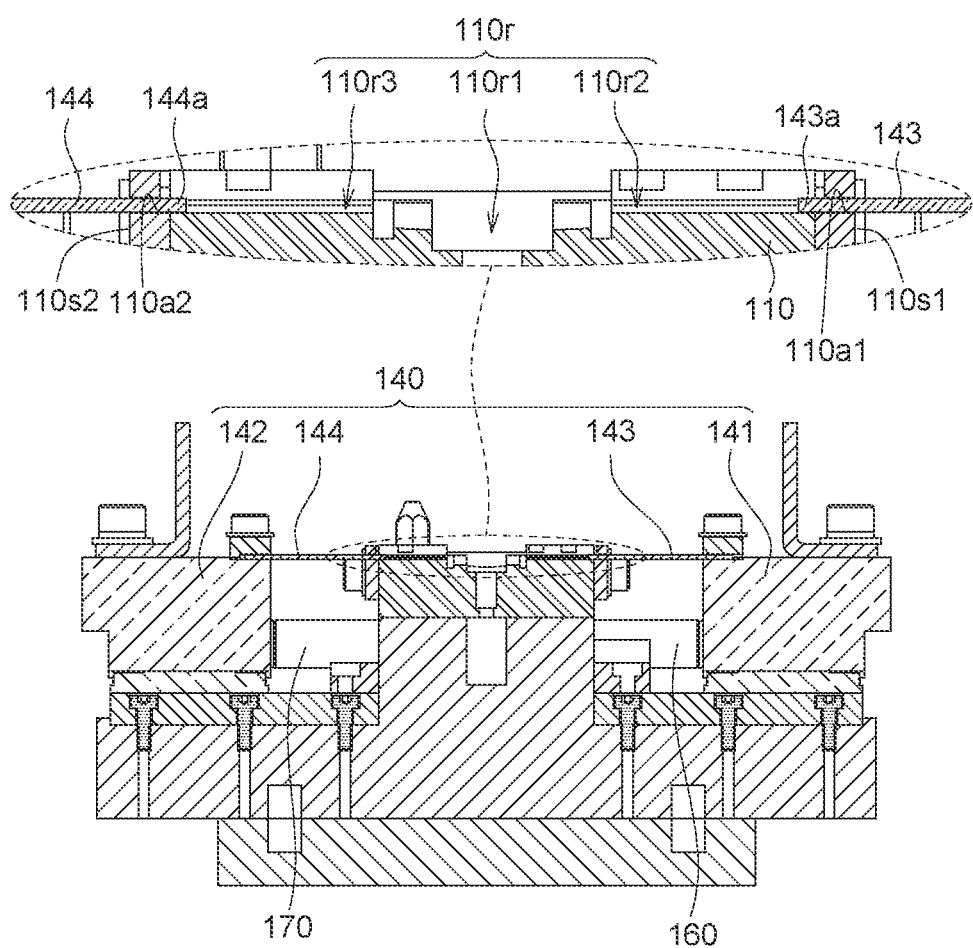
FIGS. 6A to 6F show schematic diagrams of assembling the band button of FIG. 1 using the assembly jig of FIG. 3B.

As shown in FIG. 6A, the base 110, the pressing mechanism 140, the first elastic component 160 and the second elastic component 170 are provided. The pressing mechanism 140 and the base 110 are relatively movable. For example, the pressing mechanism 140 and the base 110 are connected to be relatively movable through the first elastic component 160 and the second elastic component 170.

As shown in FIG. 6A, the base 110 has an accommodating groove 110r, and the accommodating groove 110r includes the first sub-accommodating groove 110r1, the second sub-accommodating groove 110r2 and the third sub-accommodating groove 110r3 that communicate with each other.

As shown in FIG. 6A, the pressing mechanism 140 includes the first sliding seat 141, the second sliding seat 142, the second pressing component 143 and the third pressing component 144. The second pressing component 143 is connected to the first sliding seat 141. In the present embodiment, the base 110 has the first lateral surface 110s1 and the first through hole 110a1, wherein the first through hole 110a1 extends to the accommodating groove 110r from the first lateral surface 110s1. The second pressing component 143 is disposed through the first through hole 110a1 so that the end portion 143a of the second pressing component 143 may be disposed in the second sub-accommodating groove 110r2 of the accommodating groove 110r. The third pressing component 144 is connected to the second sliding seat 142. In the present embodiment, the base 110 has the second through hole 110a2 and the second lateral surface 110s2 opposite to the first lateral surface 110s1. The second through hole 110a2 extends to the accommodating groove 110r from the second lateral surface 110s2. The third pressing component 144 is disposed through the second through hole 110a2 so that the end portion 144a of the third pressing component 144 may be disposed in the third sub-accommodating groove 110r3 of the accommodating groove 110r.

Figure 6B:
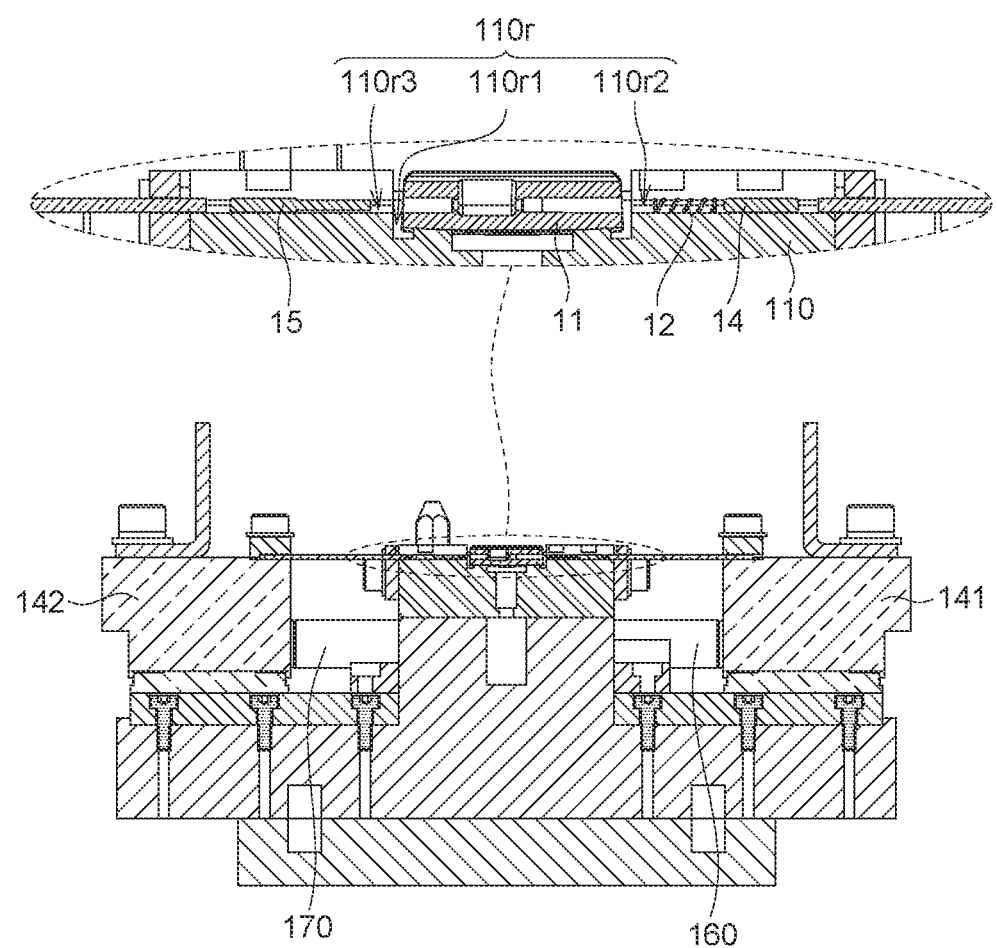

As shown in FIG. 6B, the button body 11, the compression spring 12, the compression-spring positioning pin 14 and the torsion-spring positioning pin 15 are disposed in the accommodating groove 110r of the base 110, wherein the button body 11 is disposed in the first sub-accommodating groove 110r1, the compression spring 12 and the compression-spring positioning pin 14 are disposed in the second sub-accommodating groove 110r2, and the torsion-spring positioning pin 15 is disposed in the third sub-accommodating groove 110r3. In an embodiment, the button body 11, the compression spring 12, the compression-spring positioning pin 14 and the torsion-spring positioning pin 15 may be disposed in the accommodating groove 110r at the same assembly station. Alternatively, one or some of the button body 11, the compression spring 12, the compression-spring positioning pin 14 and the torsion-spring positioning pin 15 may be disposed in the accommodating groove 110r at the same assembly station, while another or others may be disposed in the accommodating groove 110r at another assembly station.

Figure 6C:
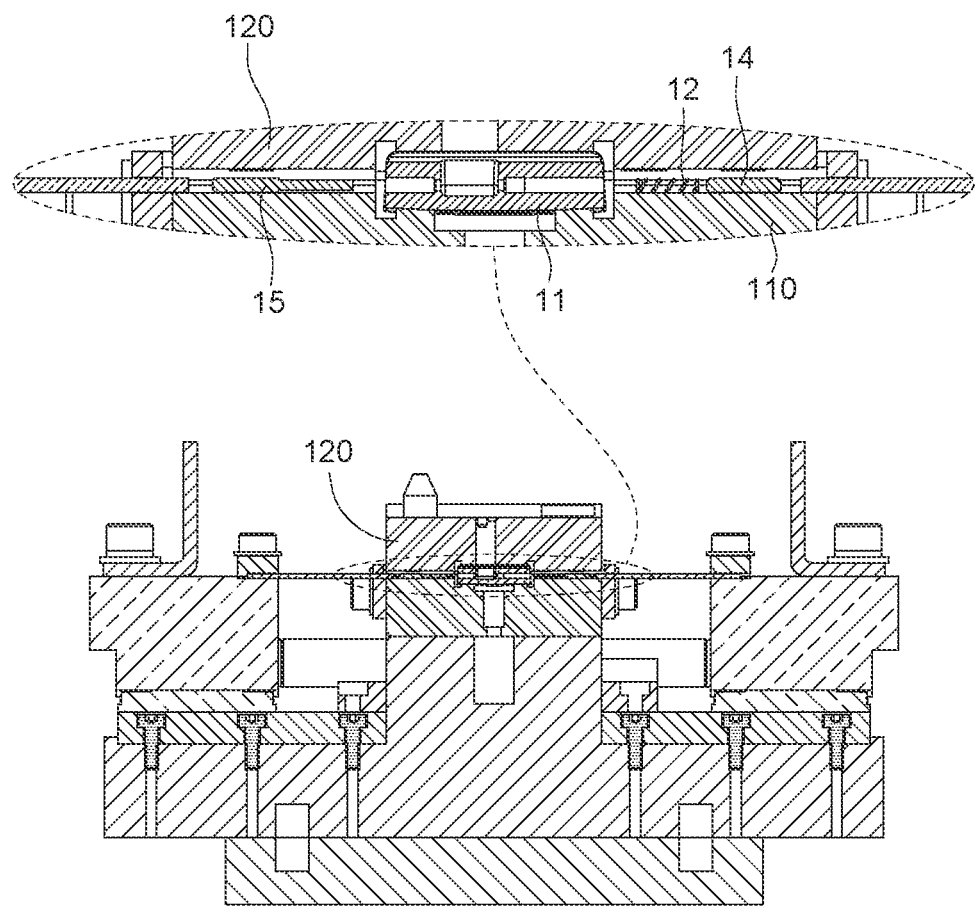

Then, as shown in FIG. 6C, the base 110 and the upper cover 120 are combined. For example, the upper cover 120 is moved to cover the base 110.

Figure 6D:
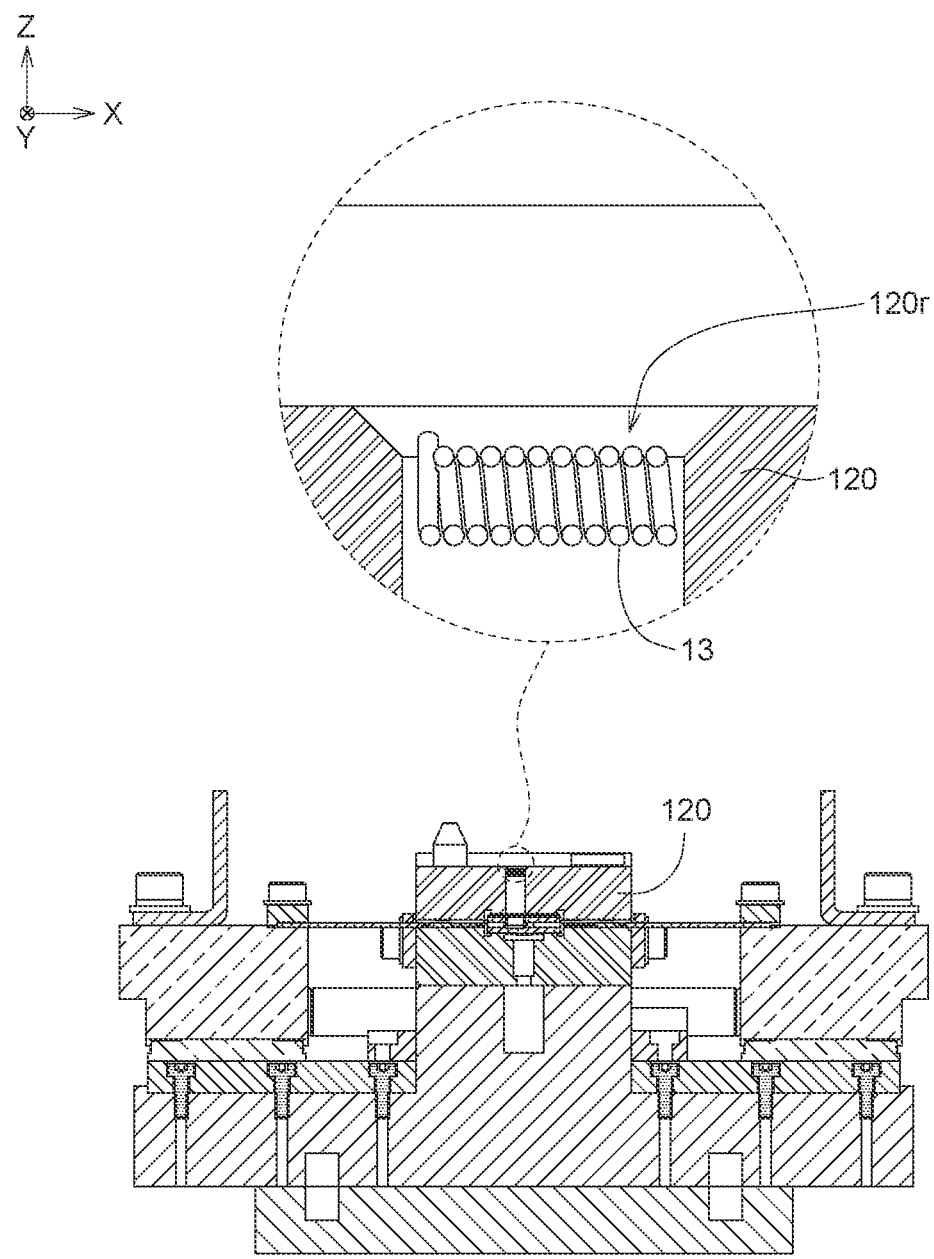

Then, as shown in FIG. 6D, the torsion spring 13 is disposed in the slot 120r of the upper cover 120.

Figure 6E:
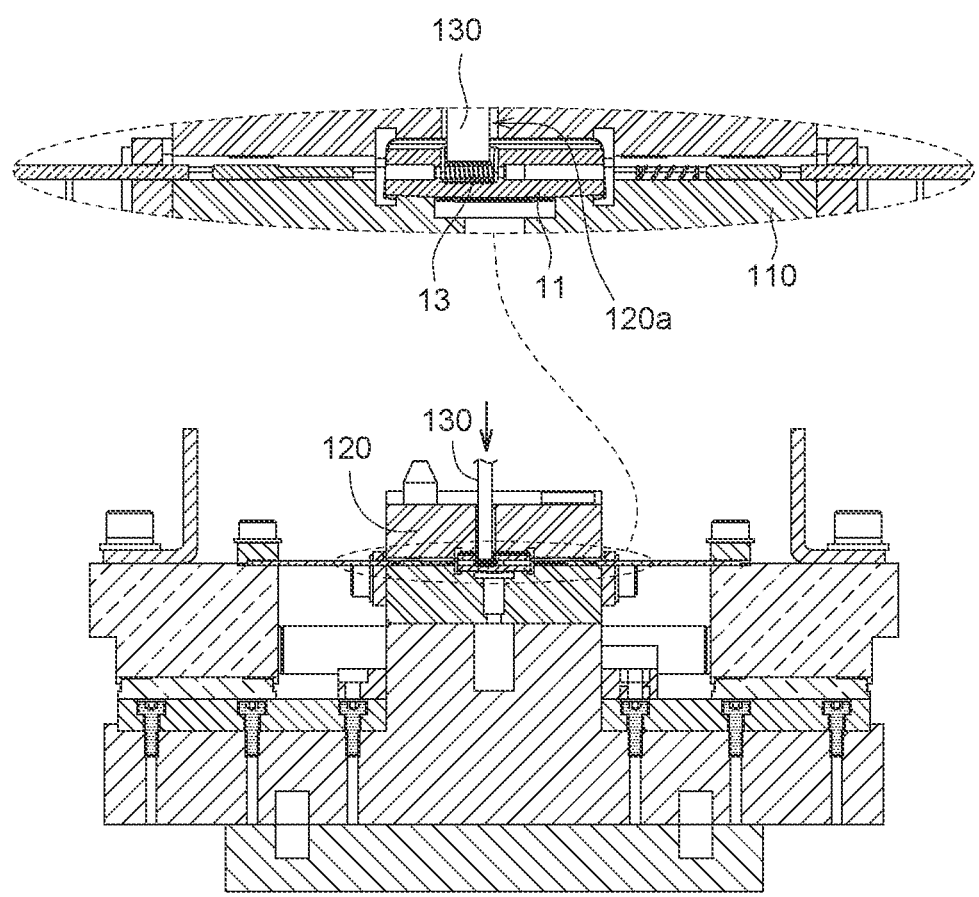

Then, as shown in FIG. 6E, the first pressing component 130 presses the torsion spring 13 into the button body 11. For example, the first pressing component 130 presses the torsion spring 13 into the button body 11 through the channel 120a. In addition, a second driving mechanism 131 (shown in FIG. 5) may be used to drive the first pressing component 130 to press the torsion spring 13 into the button body 11.

Figure 6F:
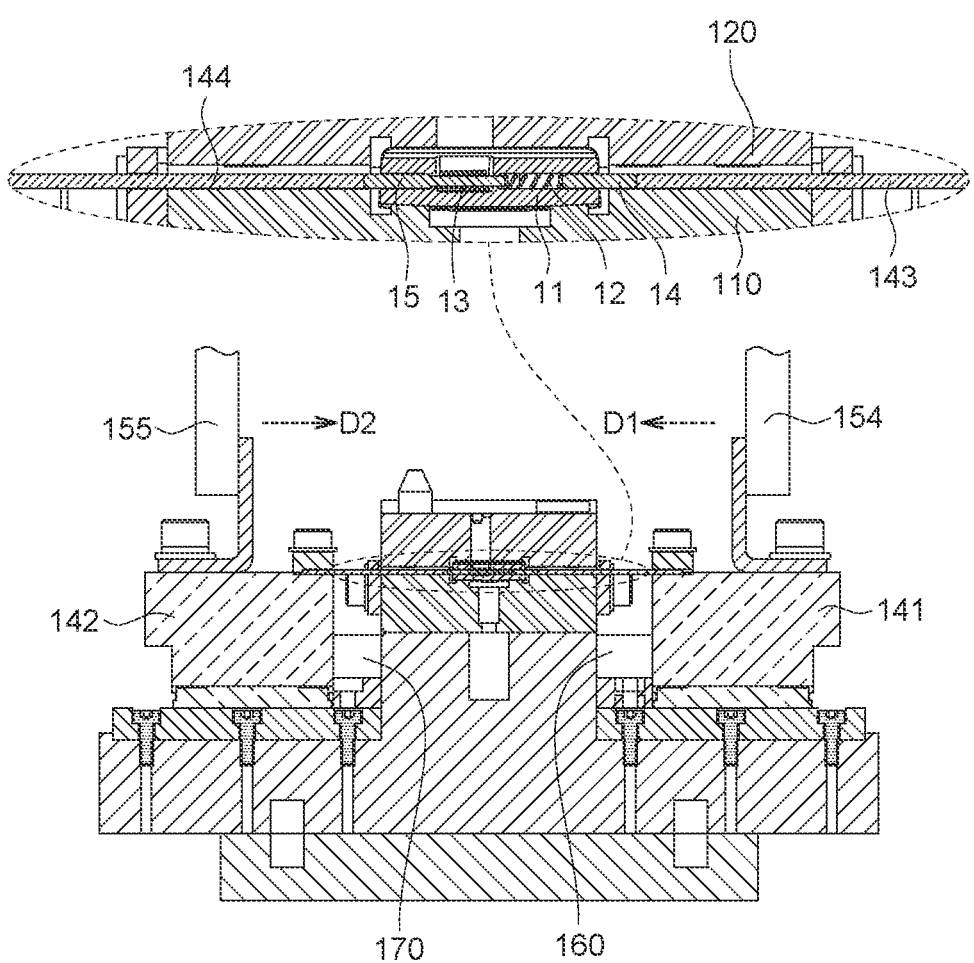

Then, as shown in FIG. 6F, the cylinder 151 of the first driving mechanism 150 (shown in FIG. 4A) drives the first sliding seat 141 along the first direction D1 so as to move the second pressing component 143 to press the compression spring 12 and the compression-spring positioning pin 14 into the button body 11, and the cylinder 151 (shown in FIG. 4A) of the first driving mechanism 150 drives the second sliding seat 142 along the second direction D2 so as to move the third pressing component 144 to press the torsion-spring positioning pin 15 into the button body 11. So far, the assembly of the band button 10 is completed.

In addition, the first sliding seat 141 and the second sliding seat 142 may be driven at the same time, or started or performed at different time points respectively.

As shown in FIG. 6F, during the movement of the first sliding seat 141 along the first direction D1, the first elastic component 160 is deformed to store the elastic potential energy. During the movement of the second sliding seat 142 along the second direction D2, the second elastic component 170 is deformed to store the elastic potential energy. After the compression spring 12, the compression-spring positioning pin 14 and the torsion-spring positioning pin 15 are pressed into the button body 11, under the driving of the cylinder 151 (shown in FIG. 4A) of the first driving mechanism 150, the first connecting rod 154 drives the first sliding seat 141 to move along the second direction D2. At this time, the first elastic component 160 releases the elastic potential energy to provide the first sliding seat 141 quickly restore. Similarly, under the driving of the cylinder 151 (shown in FIG. 4A) of the first driving mechanism 150, the second connecting rod 155 drives the second sliding seat 142 to move along the first direction D1. At this time, the second elastic component 170 releases the elastic potential energy to provide the second sliding seat 142 quickly restore.

The restoring of the first sliding seat 141 and the restoring of the second sliding seat 142 may be started or performed at the same time, or started or performed at different time points.

After the assembly of the band button 10 is completed, the upper cover 120 and the base 110 are separated, and accordingly the assembled band button 10 may be taken out.

In addition, the assembly steps of the aforementioned each assembly station may be performed, by a manual way, a driving mechanism and/or by a robotic arm.

To sum up, an embodiment of the present invention submits an assembly jig and an assembly method using the same. The assembly jig at least includes a base, an upper cover and a pressing mechanism, wherein the base has an accommodating groove, and the accommodating groove may accommodate the button body, the compression spring and the compression-spring positioning pin. The upper cover may be combined with the base and has a slot. The slot is configured to accommodate the torsion spring, the pressing mechanism may press the compression spring, the compression-spring positioning pin and the torsion-spring positioning pin into the button body. In addition, a pressing component may press the torsion spring into the button body. As a result, the band button may be automatically assembled using an assembly jig, which may reduce assembly difficulty, increase yield, reduce labor cost and/or increase productivity.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An assembly jig, suitable for assembling a band button of a watch strap, wherein the band button comprises a button body, a compression spring, a torsion spring, a compression-spring positioning pin and a torsion-spring positioning pin, and the assembly jig comprises:
   a base having an accommodating groove configured for accommodating the button body, the compression spring, the compression-spring positioning pin and the torsion-spring positioning pin;
   an upper cover combined with the base and having a slot for accommodating the torsion spring;
   a first pressing component configured for pressing the torsion spring into the button body which is accommodated in the accommodating groove; and
   a pressing mechanism configured for pressing the compression spring, the compression-spring positioning pin and the torsion-spring positioning pin into the button body which is accommodated in the accommodating groove.

2. The assembly jig according to claim 1, wherein the upper cover has a channel connecting the slot and the accommodating groove, and the first pressing component is configured for pressing the torsion spring into the button body through the channel.

3. The assembly jig according to claim 1, wherein the accommodating groove comprises a first sub-accommodating groove, a second sub-accommodating groove and a third sub-accommodating groove, and the first sub-accommodating groove is configured for accommodating the button body, the second sub-accommodating groove is configured for accommodating the compression spring and the compression-spring positioning pin, and the third sub-accommodating groove is configured for accommodating the torsion-spring positioning pin.

4. The assembly jig according to claim 3, wherein the first sub-accommodating groove, the second sub-accommodating groove and the third sub-accommodating groove extend along a moving direction, and the first sub-accommodating groove is located between the second sub-accommodating groove and the third sub-accommodating groove.

5. The assembly jig according to claim 4, wherein the upper cover has a channel connecting the slot and the accommodating groove, the channel extends along an extending direction, and the extending direction and the moving direction are perpendicular to each other.

6. The assembly jig according to claim 1, wherein the slot has an upper opening and a lower opening opposite to the upper opening, and the lower opening is smaller than the upper opening.

7. The assembly jig according to claim 6, wherein the torsion spring comprises a spiral portion, a first end and a second end opposite to the first end, the spiral portion is disposed between the first end and the second end, the slot has a first wall and a second wall opposite to the first wall, the first wall and the second wall are configured for supporting the first end and the second end respectively.

8. The assembly jig according to claim 1, wherein the pressing mechanism comprises:
a first sliding seat;
a second sliding seat;
a second pressing component disposed on the first sliding seat, wherein an end of the second pressing component faces the compression-spring positioning pin so as to press the compression spring and the compression-spring positioning pin into the band button; and
a third pressing member disposed on the second sliding seat, wherein an end of the third pressing component faces the torsion-spring positioning pin, so as to press the torsion-spring positioning pin into the button body;
wherein the assembly jig further comprises a first driving mechanism configured for driving the first sliding seat and the second sliding seat.

9. The assembly jig described in claim 8, further comprising:
a first elastic component connecting the base and the first sliding seat for providing the first sliding seat with a first elastic restoring force to restore the second pressing component; and
a second elastic component connecting the base and the second sliding seat for providing the second sliding seat with a second elastic restoring force to restore the third pressing member.

10. The assembly jig according to claim 1, wherein the assembly jig further comprises a second driving mechanism configured for driving the first pressing component to press the torsion spring into the button body.

11. An assembly method for assembling a band button by using an assembly jig, wherein the assembly jig comprises a base, an upper cover, a first pressing component and a pressing mechanism, and the assembly method comprises:
disposing a button body, a compression spring, a compression-spring positioning pin and a torsion-spring positioning pin in an accommodating groove of the base;
combining the base with the upper cover;
disposing a torsion spring in a slot of the upper cover;
pressing, by the first pressing component, the torsion spring into the button body which is accommodated in the accommodating groove; and
pressing, by the pressing mechanism, the compression spring, the compression-spring positioning pin and the torsion-spring positioning pin into the button body which is accommodated in the accommodating groove.

12. The assembly method according to claim 11, wherein the upper cover has a channel connecting the slot and the accommodating groove, and pressing the torsion spring into the button body which is accommodated in the accommodating groove further comprises:
pressing, by the first pressing component, the torsion spring into the button body through the channel.

13. The assembly method of claim 11, wherein the accommodating groove comprises a first sub-accommodating groove, a second sub-accommodating groove and a third sub-accommodating groove, and disposing the button body, the compression spring, the compression-spring positioning pin and the torsion-spring positioning pin in the accommodating groove of the base further comprises:
disposing the button body in the first sub-accommodating groove;
disposing the compression spring and the compression-spring positioning pin in the second sub-accommodating groove; and
disposing the torsion-spring positioning pin in the third sub-accommodating groove.

14. The assembly method according to claim 11, wherein the assembly jig further comprises a first driving mechanism comprising a first sliding seat, a second sliding seat, a second pressing component and a third pressing component, the second pressing component is disposed on the first sliding seat, and the third pressing component is disposed on the second sliding seat; disposing the button body, the compression spring, the compression-spring positioning pin and the torsion-spring positioning pin in the accommodating groove of the base further comprises:
driving, by the first driving mechanism, the first sliding seat to move the second pressing component to press the compression spring and the compression-spring positioning pin into the band button which is accommodated in the accommodating groove; and
driving, by the first driving mechanism, the second sliding seat to move the third pressing component to press the torsion-spring positioning pin into the button body which is accommodated in the accommodating groove.

15. The assembly method according to claim 14, wherein the assembly jig further comprises a first elastic component and a second elastic component, the first elastic component connects the base and the first sliding seat, the second elastic component connects the base and the second sliding seat; in driving the first sliding seat to move the second pressing component, the first elastic component deforms and stores a first elastic potential energy; in driving the second sliding seat to move the third pressing component, the second elastic component deforms and stores a second elastic potential energy; the assembly method further comprises:
releasing, by the first elastic component, the first elastic potential energy to provide the first sliding seat with a first elastic restoring force to restore the second pressing component; and
releasing, by the second elastic component, the second elastic potential energy to provide the second sliding seat with a second elastic restoring force to restore the third pressing component.

16. The assembly method according to claim 11, wherein the assembly jig further comprises a second driving mechanism, and the assembly method comprises:
driving, by the second driving mechanism, the first pressing component to press the torsion spring into the button body which is accommodated in the accommodating groove.

* * * * *